US012693152B2

(12) United States Patent
Zhang et al.

(10) Patent No.: US 12,693,152 B2
(45) Date of Patent: Jul. 28, 2026

(54) DIGITAL LOAD CELL WITH REDUNDANCY DESIGN

(71) Applicants: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

(72) Inventors: Ying Zhang, Changzhou (CN); Hongzhi Lin, Changzhou (CN); Jianwei Wu, Changzhou (CN); Miao Xu, Changzhou (CN)

(73) Assignees: Mettler-Toledo (Changzhou) Precision Instruments Ltd., Changzhou (CN); Mettler-Toledo (Changzhou) Measurement Technology Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 312 days.

(21) Appl. No.: 18/283,522

(22) PCT Filed: Apr. 15, 2022

(86) PCT No.: PCT/CN2022/087205
§ 371 (c)(1),
(2) Date: Sep. 22, 2023

(87) PCT Pub. No.: WO2022/199712
PCT Pub. Date: Sep. 29, 2022

(65) Prior Publication Data
US 2024/0102849 A1     Mar. 28, 2024

(30) Foreign Application Priority Data

Mar. 25, 2021     (CN) .......................... 202110321690.0

(51) Int. Cl.
*G01G 23/01* (2006.01)
*G01G 23/18* (2006.01)

(52) U.S. Cl.
CPC ............. *G01G 23/01* (2013.01); *G01G 23/18* (2013.01)

(58) Field of Classification Search
CPC ............................... G01G 23/01; G01G 23/18
See application file for complete search history.

(56) References Cited

U.S. PATENT DOCUMENTS

| | | | |
|---|---|---|---|
| 8,806,963 B2 | 8/2014 | Langhans | |
| 2009/0128160 A1* | 5/2009 | Chiaburu | G01D 3/08 702/58 |

(Continued)

FOREIGN PATENT DOCUMENTS

CN          102706505  A  * 10/2012

OTHER PUBLICATIONS

Machine translation of CN 102706505 (Year: 2012).*

*Primary Examiner* — Natalie Huls
(74) *Attorney, Agent, or Firm* — Standley Law Group LLP; Jeffrey S. Standley; Adam J. Smith

(57) ABSTRACT

The present invention provides a digital load cell with redundancy design, the digital load cell including: at least one force measuring element that measures a load force applied to the digital load cell, where each force measuring element converts the load force into one analog signal; and one or more analog-to-digital conversion modules, where each force measuring element is connected to at least one analog-to-digital conversion module, and the analog-to-digital conversion module converts the analog signal into a digital signal. According to the digital load cell of the present invention, redundancy design is provided at least for both the force measuring element and the analog-to-digital (Continued)

conversion module, which can effectively ensure the proper operation of the digital load cell.

9 Claims, 4 Drawing Sheets

(56) References Cited

U.S. PATENT DOCUMENTS

2012/0059626 A1* 3/2012 Li ........................ G01G 11/003
                                                        702/173
2023/0184581 A1* 6/2023 Haase ................ G01G 23/3707
                                                        177/50

* cited by examiner

Load

DIGITAL LOAD CELL WITH REDUNDANCY DESIGN

BACKGROUND OF THE INVENTION

1. Field of the Invention

The present invention mainly relates to the field of precision instruments, and in particular to a digital load cell with redundancy design.

2. The Related Art

In modern industrial production procedures, weight information is a key information source and control target. For example, in a vehicle scale system, weight information is output data that needs to be obtained. For a filling production line, weight information is a control target of filling production procedures. Therefore, the reliability and precision of weighing are of great significance.

With the development of digital and information technologies, a weighing device has transformed from a traditional mechanical system to a digital system. A digital load cell is a sensor having a built-in circuit with a high-precision analog-to-digital conversion function and a digital processing capability, which converts load force information of the sensor into a digital signal, processes the digital signal as required, and displays the digital signal on a user terminal. In a weighing system based on a digital load cell, the reliability of weighing data obtained by the digital load cell is of great significance.

SUMMARY

A technical problem to be solved by the present invention is to provide a digital load cell with multiple high-reliability redundancy design.

To solve the foregoing technical problem, the present invention provides a digital load cell with redundancy design, characterized by including: at least one force measuring element that measures a load force applied to the digital load cell, where each force measuring element converts the load force into one analog signal; and one or more analog-to-digital conversion modules, where each force measuring element is connected to at least one analog-to-digital conversion module, and the analog-to-digital conversion module converts the analog signal into a digital signal.

In an embodiment of the present invention, each force measuring element is connected to at least two analog-to-digital conversion modules.

In an embodiment of the present invention, the digital load cell further includes one or more processors, where each analog-to-digital conversion module is connected to at least one processor, and the processor processes the digital signal.

In an embodiment of the present invention, the digital load cell further includes one or more storage units, where each processor is connected to at least one storage unit.

In an embodiment of the present invention, the digital load cell further includes one or more power supply units, where each processor is connected to at least one power supply unit.

In an embodiment of the present invention, the digital load cell further includes one or more communication units, where each processor is connected to at least one communication unit, and the communication unit is adapted to communicate with an external device.

In an embodiment of the present invention, the digital load cell further includes an alarm unit, where the processor compares the digital signal with a threshold to obtain a comparison result, and prompts, based on the comparison result, the alarm unit to issue an alarm.

In an embodiment of the present invention, the processor calculates a difference between at least two digital signals, and the difference is used for fault trend analysis.

In an embodiment of the present invention, in the process of applying a load to the digital load cell, the processor compares at least two digital signals to obtain a dynamic comparison result.

In an embodiment of the present invention, the digital load cell further includes an alarm unit, where the processor compares the dynamic comparison result with a dynamic threshold range to obtain a dynamic comparison result, and prompts, based on the dynamic comparison result, the alarm unit to issue an alarm.

In an embodiment of the present invention, the digital load cell further includes one or more limiting protection devices, where the limiting protection device limits the digital load cell to a predetermined area.

According to the digital load cell of the present invention, redundancy design is provided for both the force measuring element and the analog-to-digital conversion module, which can effectively ensure proper operation of the digital load cell. According to the digital load cell of the present invention, redundancy design is further provided for a processor and a storage unit related to a detection circuit, for a power supply unit, a communication unit, an alarm unit, and other functional elements, and for safety facilities including a limiting protection device, thereby providing multiple safety assurance for the digital load cell in a plurality of aspects, and greatly improving the reliability of the digital load cell.

BRIEF DESCRIPTION OF THE DRAWINGS

The accompanying drawings are included to provide a further understanding of the present application and are incorporated in and constitute a part of the present application, show the embodiments of the present application, and serve to, together with this specification, explain the principles of the present invention. In the drawings.

DETAILED DESCRIPTION OF EMBODIMENTS

Figure 1:
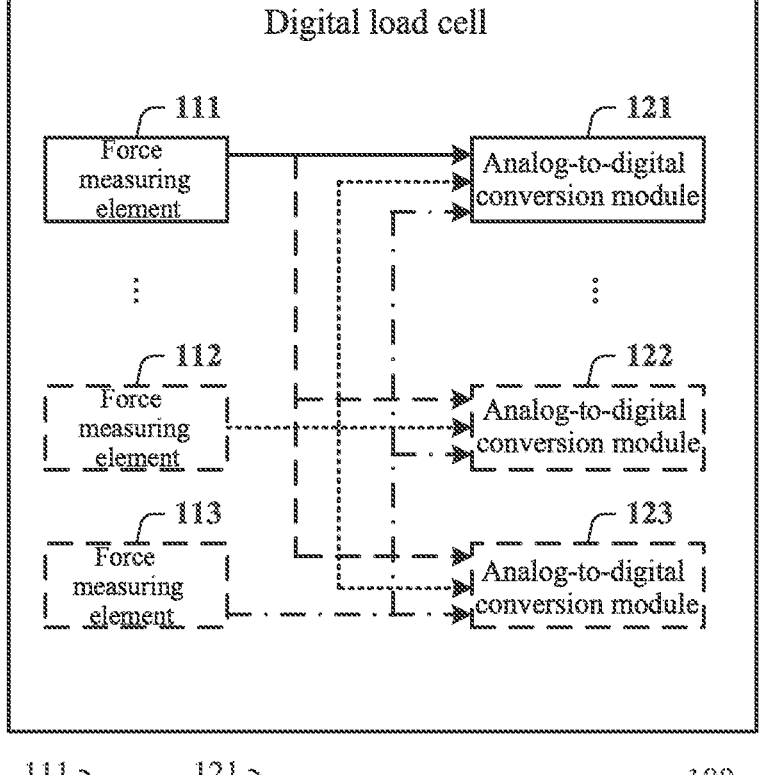
FIG. 1 is a structural block diagram of a digital load cell according to an embodiment of the present invention.

To describe the technical solutions in embodiments of the present application more clearly, the accompanying drawings required for describing the embodiments will be briefly introduced below. Apparently, the accompanying drawings in the following description show merely some examples or embodiments of the present application, and those of ordinary skill in the art would apply the present application to other similar scenarios according to these drawings without any creative effort. Unless it is obvious from the language environment or otherwise stated, the same reference numerals in the accompanying drawings represent the same structure or operation.

As shown in the present application and the claims, unless the context expressly indicates otherwise, the words "a", "an", "said", and/or "the" do not specifically refer to the singular, but may also include the plural. Generally, the terms "include" and "comprise" only suggest that the expressly identified steps and elements are included, but these steps and elements do not constitute an exclusive list, and the method or device may further include other steps or elements.

Unless specifically stated otherwise, the relative arrangement of components and steps, numerical expressions and numerical values set forth in these embodiments do not limit the scope of the present application. In addition, it should be understood that, for ease of description, the sizes of various parts shown in the drawings are not drawn to scale. The technologies, methods, and devices known to those of ordinary skill in the related art may not be discussed in detail, but where appropriate, the technologies, methods, and devices should be regarded as part of the authorization specification. In all examples shown and discussed here, any specific value should be interpreted as merely exemplary and not as limiting. Therefore, other examples of the exemplary embodiment may have different values. It should be noted that similar reference signs and letters refer to similar items in the following drawings. Therefore, once a specific item is defined in one of the drawings, it need not be further discussed in subsequent drawings.

In the description of the present application, it should be understood that, an orientation or position relationship indicated by orientation terms such as "front, rear, upper, lower, left, and right", "transverse, longitudinal, vertical, and horizontal", and "top and bottom" is usually based on an orientation or position relationship shown in the drawings, which is only for the convenience of describing the present application and simplifying the description. Unless otherwise stated, these orientation terms do not indicate or imply that an apparatus or element referred to must have a specific orientation or be constructed and operated in a specific orientation, so that the orientation terms cannot be understood as a limitation of the protection scope of the present application; and the orientation terms "inner and outer" refer to the inside and outside relative to the contour of each component itself.

For convenience of description, spatially relative terms such as "on", "above", "on the top surface", and "upper" can be used herein to describe a spatial position relationship between a device or a feature shown in the figure and other devices or features. It should be understood that spatially relative terms are intended to include different orientations in use or operation in addition to the orientation of the device described in the figure. For example, if the device in the figure is inverted, the device described as "on other devices or structures" or "above other devices or structures" will then be positioned as "under other devices or structures" or "below other devices or structures". Therefore, the exemplary term "above" may include two orientations "above" and "below". The device may also be positioned in other different manners (rotated by 90 degrees or in other orientations), and a spatially relative description used here is explained accordingly.

In addition, it should be noted that the use of words such as "first" and "second" to define parts is merely for the convenience of distinguishing between corresponding parts. Unless otherwise stated, the above words have no special meaning and therefore cannot be understood as a limitation to the protection scope of the present application. Furthermore, although the terms used in the present application are selected from well-known common terms, some of the terms mentioned in the specification of the present application may have been selected by the applicant according to his or her determination, and the detailed meaning thereof is described in the relevant section described herein. Furthermore, the present application must be understood, not simply by the actual terms used but also by the meanings encompassed by each term.

FIG. 1 is a structural block diagram of a digital load cell according to an embodiment of the present invention. Referring to FIG. 1, the digital load cell 100 in this embodiment includes at least one force measuring element, where the at least one force measuring element 110 is configured to detect a load force applied to the digital load cell 100, and each force measuring element 110 converts its measured load force into one analog signal; and one or more analog-to-digital conversion modules 120, where each force measuring element 110 is connected to at least one analog-to-digital conversion module 120, and the analog-to-digital conversion module 120 converts the analog signal into a digital signal.

FIG. 1 shows three force measuring elements 111, 112, and 113, and three analog-to-digital conversion modules 121, 122, and 123. The digital load cell 100 includes at least a force measuring element 111 and an analog-to-digital conversion module 121 that are represented by solid line boxes. The force measuring element 111 and the analog-to-digital conversion module 121 are connected to each other, which is represented by a solid line with an arrow in FIG. 1. The analog-to-digital conversion module 121 receives an analog signal from the force measuring element 111 and converts the analog signal into a digital signal. The digital signal may be used for subsequent processing, display, etc.

Referring to FIG. 1, the digital load cell 100 may further include force measuring elements 112 and 113 and analog-to-digital conversion modules 122 and 123 that are represented by dashed line boxes. Since each force measuring element 110 is connected to at least one analog-to-digital conversion module 120, for the embodiment shown in FIG. 1, the force measuring element 111 is connected to at least one of the analog-to-digital conversion modules 120, and may be connected to at most all the analog-to-digital conversion modules, which is represented by a dashed line with an arrow in FIG. 1. Similarly, the force measuring element 112 is connected to at least one of the analog-to-digital conversion modules 120, and may be connected to at most all the analog-to-digital conversion modules. The force measuring element 113 is connected to at least one of the analog-to-digital conversion modules 120, and may be connected to at most all the analog-to-digital conversion modules.

It can be understood that when all the dashed lines with arrows in FIG. 1 represent actual connections, the digital load cell forms an interconnected work of the three force measuring elements 111, 112, and 113 and the three analog-to-digital conversion modules 121, 122, and 123, and each analog-to-digital conversion module 120 may receive and process three analog signals from the three force measuring elements 111, 112, and 113. In this case, as long as one force measuring element 110 and one analog-to-digital conversion module 120 work properly, the digital load cell 100 can work properly and can output, when applied with a load, a weighing result successfully, thereby improving the reliability of the digital load cell 100.

It should be noted that the content shown in FIG. 1 is merely an example, and is not used to limit the number of force measuring elements and analog-to-digital conversion modules in the digital load cell of the present invention and a connection relationship therebetween.

In some embodiments, each force measuring element is connected to at least two analog-to-digital conversion modules.

Figure 2:
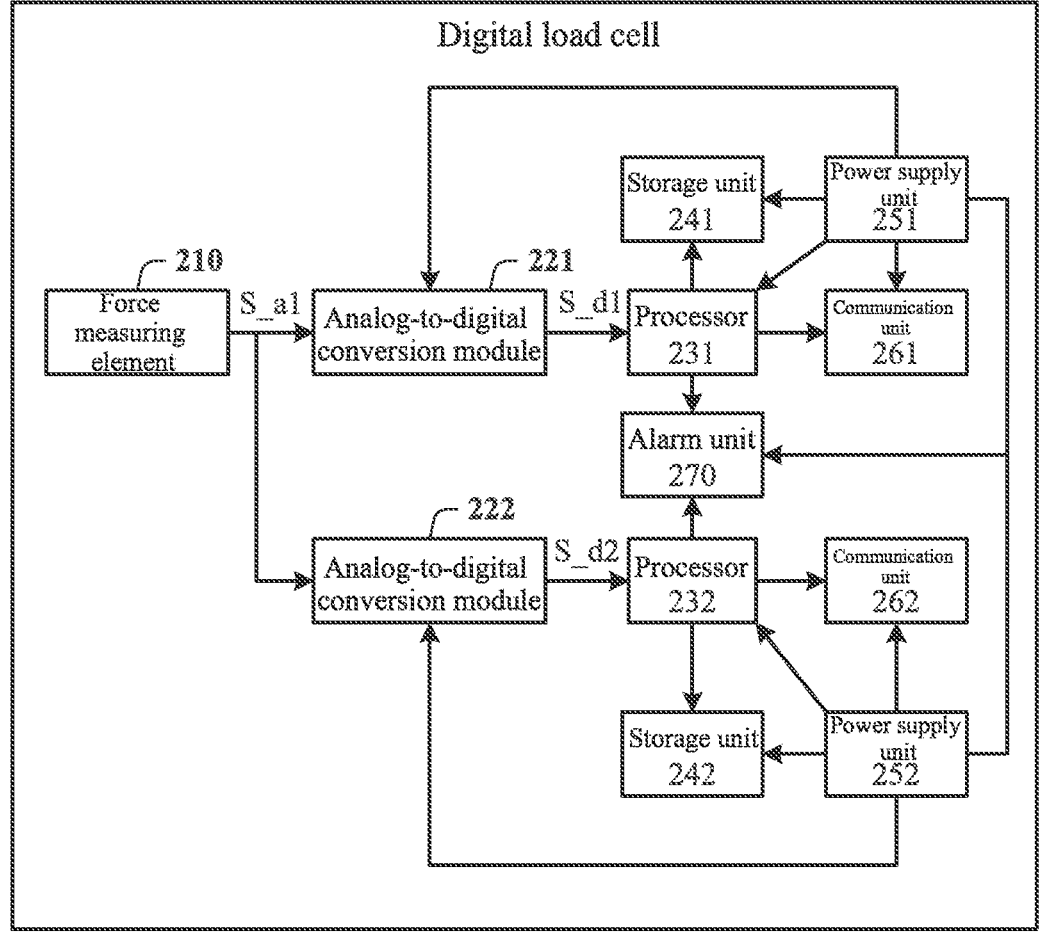
FIG. 2 is a structural block diagram of a digital load cell according to another embodiment of the present invention.

FIG. 2 is a structural block diagram of a digital load cell according to another embodiment of the present invention. Referring to FIG. 2, the digital load cell 200 in this embodiment includes one force measuring element 210 and two analog-to-digital conversion modules 220. FIG. 2 is a preferred embodiment of the present invention. In this embodiment, the force measuring element 210 converts a load force into one analog signal S_a1, and separately delivers the analog signal S_a1 to two analog-to-digital conversion modules 221 and 222. The two analog-to-digital conversion modules 221 and 222 may simultaneously convert the analog signal S_a1 into digital signals S_d1 and S_d2, and send the digital signals S_d1 and S_d2 to subsequent processing modules for processing, display, and other operations.

According to the preferred embodiment shown in FIG. 2, each force measuring element is connected to at least two analog-to-digital conversion modules, which can ensure that when one analog-to-digital conversion module becomes faulty, there is another redundant analog-to-digital conversion module for receiving the analog signal of the force measuring element and processing the analog signal, to ensure that the digital load cell 200 can obtain a valid measurement result, and the reliability of the digital load cell 200 is improved.

In some embodiments, the digital load cell of the present invention further includes one or more processors, where each analog-to-digital conversion module is connected to at least one processor, and the processor processes the digital signal.

Still referring to FIG. 2, this embodiment further includes two processors 231 and 232. The analog-to-digital conversion module 221 is connected to the processor 231, and the analog-to-digital conversion module 222 is connected to the processor 232. It can be understood that the analog-to-digital conversion module 221 may be connected to both the processors 231 and 232, and the analog-to-digital conversion module 222 may be connected to both the processors 231 and 232. If the digital load cell includes only one processor, both the analog-to-digital conversion modules 221 and 222 may be connected to the processor, and the processor may process both the digital signals S_d1 and S_d2 output by the analog-to-digital conversion modules 221 and 222.

In some embodiments, the processor calculates a difference between at least two digital signals, and the difference is used for fault trend analysis. Referring to FIG. 2, the processors 231 and 232 may perform any processing after obtaining the digital signals S_d1 and S_d2 from the analog-to-digital conversion modules 221 and 222. In these embodiments, the processors 231 and 232 calculate a difference Diff between the two digital signals S_d1 and S_d2. For a digital load cell in a normal state, the two digital signals S_d1 and S_d2 should have an expected value. For example, the two digital signals S_d1 and S_d2 should be the same or proportional, have a difference within a specific range, or be symmetrical. Then, the difference Diff between the two digital signals S_d1 and S_d2 is actually obtained through calculation, and the difference is compared with an expected result, which may be used for fault trend analysis of the digital load cell to notify a user of a risk of a fault. For example, the difference Diff between the two digital signals S_d1 and S_d2 shall fall within a difference range Diff1. If the difference Diff calculated by the processors 231 and 232 is close to or exceeds a boundary value of the difference range Diff1, the user may be notified that the digital load cell has a relatively high risk of a fault. By long-term calculation and recording, a fault trend analysis curve can be drawn, which is more convenient for the user to predict the risk of a fault.

In some embodiments, in the process of applying a load to the digital load cell, the processor may further compare the at least two digital signals to obtain a dynamic comparison result. The process of applying a load is a process of adding a load onto the digital load cell, and the load refers to an object to be weighed. In this process, the digital load cell is in a dynamic state, and its weighing result is also in a dynamic state. After the load has been applied for a specific period of time, a stable weighing result can be obtained as a weighing result of the load. Referring to FIG. 2, the processors 231 and 232 can compare the two digital signals S_d1 and S_d2 in the load applying process to obtain a dynamic comparison result Diff_d, and the dynamic comparison result Diff_d can reflect real-time load information of the digital load cell. A storage unit may store the dynamic comparison result Diff_d, so that the user views or analyzes a real-time load status of the digital load cell. When the weighing result is anomalous, a cause of the anomaly may be analyzed with reference to the real-time load status.

The plurality of processors in this embodiment implement the redundancy design of the processors in the digital load cell. When a processor becomes faulty, a processor in a normal state can still receive a digital signal output by the analog-to-digital conversion module, and further control each element in the digital load cell.

In some embodiments, the digital load cell of the present invention further includes one or more storage units, and each processor is connected to at least one storage unit.

Still referring to FIG. 2, this embodiment further includes two storage units 241 and 242. The storage unit 241 is connected to the processor 231, and the storage unit 242 is connected to the processor 232. It can be understood that the storage unit 241 may be connected to both the processors 231 and 232, and the storage unit 242 may be connected to both the processors 231 and 232. If the digital load cell includes only one storage unit, both the processors 231 and 232 may be connected to the storage unit, and the storage unit may store both the digital signals S_d1 and S_d2 output by the analog-to-digital conversion modules 221 and 222, and data, instructions, etc. sent or received by the processors 231 and 232.

In some embodiments, the storage unit is configured to store configuration information of the digital load cell, and a threshold, data, and other information required in a process of processing a digital signal.

The plurality of storage units in this embodiment implement the redundancy design of the storage units in the digital load cell. When a storage unit becomes faulty, a storage unit in a normal state can still work.

In some embodiments, the digital load cell of the present invention further includes one or more power supply units, and each processor is connected to at least one power supply unit.

Still referring to FIG. 2, this embodiment further includes two power supply units 251 and 252. The power supply unit 251 is connected to the processor 231, and the power supply unit 252 is connected to the processor 232. Referring to FIG. 2, the power supply units 251 and 252 may further supply power to other units or modules in the digital load cell 200, for example, to the analog-to-digital conversion modules 221 and 222, storage units 241 and 242, communication units 261 and 262, the alarm unit 270, etc.

It can be understood that the power supply unit 251 may be connected to both the processors 231 and 232, and the power supply unit 252 may be connected to both the processors 231 and 232. If the digital load cell 200 includes only one power supply unit, both the processors 231 and 232 may be connected to the power supply unit.

The plurality of power supply units in this embodiment implement the redundancy design of the power supply units in the digital load cell. When a power supply unit becomes faulty, a power supply unit in a normal state can still work to ensure that the digital load cell 200 works properly.

In some embodiments, the digital load cell of the present invention further includes one or more communication units, each processor is connected to at least one communication unit, and the communication unit is adapted to communicate with an external device.

Still referring to FIG. 2, this embodiment further includes two communication units 261 and 262. The communication unit 261 is connected to the processor 231, and the communication unit 262 is connected to the processor 232. It can be understood that the communication unit 261 may be connected to both the processors 231 and 232, and the communication unit 262 may be connected to both the processors 231 and 232. If the digital load cell 200 includes only one communication unit, both the processors 231 and 232 may be connected to the communication unit, and the communication unit may work according to control instructions of the processors 231 and 232, and may transmit the digital signals S_d1 and S_d2 from the different analog-to-digital conversion modules 221 and 222 to terminals such as displays and user interfaces.

The present invention does not limit specific communication modes of the communication units 261 and 262, and common technologies in the field, such as wired and wireless technologies, can be used. A communication network 0 used may include a cable network, a wired network, a fiber-optic network, a telecommunications network, an intranet, a wireless local area network (WLAN), a metropolitan area network (MAN), a public switched telephone network (PSTN), a Bluetooth™ network, a ZigBee™ network, a Near Field Communication (NFC) network, etc. or any combination thereof.

The plurality of communication units in this embodiment implement the redundancy design of the communication units in the digital load cell. When a communication unit becomes faulty, a communication unit in a normal state can still work.

In some embodiments, the digital load cell of the present invention further includes an alarm unit, where the processor compares the digital signal with a threshold to obtain a comparison result, and prompts, based on the comparison result, the alarm unit to issue an alarm.

Referring to FIG. 2, this embodiment further includes an alarm unit 270. Both the processors 231 and 232 are connected to the alarm unit 270. The power supply units 251 and 252 can also be connected to the alarm unit 270 to supply power to the alarm unit. The present invention does not limit the number of alarm units 270, and a plurality of alarm units may be included. As redundancy design of the alarm unit, each processor is connected to one alarm unit.

In these embodiments, a threshold Th may be stored in the storage units 241 and 242, or may be stored in caches of the processors 231 and 232. During use of the digital load cell 200, the processors 231 and 232 compare the digital signals S_d1 and S_d2 obtained from the analog-to-digital conversion modules 221 and 222 with the threshold Th to obtain a comparison result. The present invention does not limit a specific comparison method, and those skilled in the art may use any comparison method. For example, in a case of value comparison, the obtained comparison result may include: the digital signals being greater than the threshold Th, the digital signals being equal to the threshold Th, and the digital signals being equal to the threshold Th. When there are a plurality digital signals, different thresholds can be set for digital signals obtained by different analog-to-digital conversion modules. For example, a threshold Th1 is set for the digital signal S_d1, and a threshold Th2 is set for the digital signal S_d2. In this embodiment, the processors 231 and 232 compare the digital signal S_d1 with the threshold Th1, and compare the digital signal S_d2 with the threshold Th2 to obtain two comparison results.

The digital signals S_d1 and S_d2 may be static data when the digital load cell 200 is in a static state, or may be dynamic data in a dynamic process of weighing.

In some embodiments, the processor compares the dynamic comparison result with a dynamic threshold range to obtain a dynamic comparison result, and prompts, based on the dynamic comparison result, the alarm unit to issue an alarm. The dynamic comparison result here is a dynamic comparison result Diff_d obtained by the processor comparing the at least two digital signals in the process of applying a load to the digital load cell. Referring to FIG. 2, the processors 231 and 232 may also compare the dynamic comparison result Diff_d with a preset dynamic threshold range Diff_d1, and prompt, based on the dynamic comparison result, the alarm unit 270 to issue an alarm. For example, when the dynamic comparison result Diff_d exceeds the dynamic threshold range Diff_d1, the alarm unit 270 issues an alarm.

Figure 3:
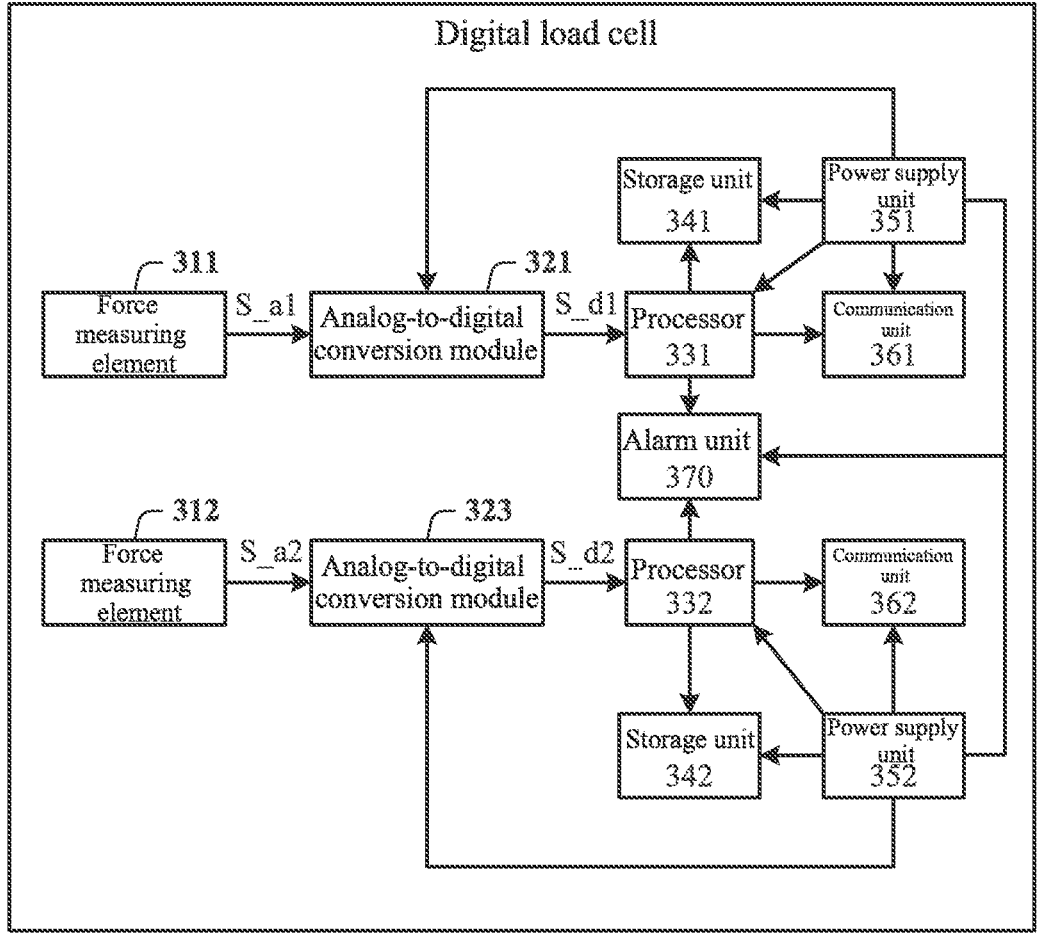
FIG. 3 is a structural block diagram of a digital load cell according to another embodiment of the present invention.

FIG. 3 is a structural block diagram of a digital load cell according to another embodiment of the present invention. Referring to FIG. 3, the digital load cell 300 in this embodiment includes two force measuring elements 310 and two analog-to-digital conversion modules 320. FIG. 3 is a preferred embodiment of the present invention. In this embodiment, the force measuring element 311 converts a load force into one analog signal S_a1, and delivers the analog signal S_a1 to an analog-to-digital conversion module 221. The force measuring element 312 converts the load force into one analog signal S_a2, and delivers the analog signal S_a2 to an analog-to-digital conversion module 222. The analog-to-digital conversion modules 221 and 222 convert the analog signals S_a1 and S_a2 into digital signals S_d1 and S_d2, respectively, and send the digital signals S_d1 and S_d2 to subsequent processing modules for processing, display, and other operations.

According to the embodiment shown in FIG. 3, the digital load cell 300 may include a plurality of force measuring elements 311 and 312, and the plurality of force measuring elements 311 and 312 may be distributed at various positions in the digital load cell 300. Normally, when a load is applied, each force measuring element can detect a load force and convert the load force into one analog signal.

A difference between the embodiment shown in FIG. 3 and the embodiment shown in FIG. 2 is that the force measuring elements 311 and 312 are redundancy design for each other. When one force measuring element becomes faulty, the other force measuring element can work properly, thereby ensuring that the digital load cell 300 may output a weighing result successfully.

Similar to the embodiment shown in FIG. 2, the embodiment shown in FIG. 3 may also include two processors 331 and 332, two storage units 341 and 342, two power supply units 351 and 352, two communication units 361 and 362, and an alarm unit 370. For a connection relationship between and functions of these elements, reference may be made to the corresponding description content of FIG. 2, and details are not repeated here.

Figure 4:
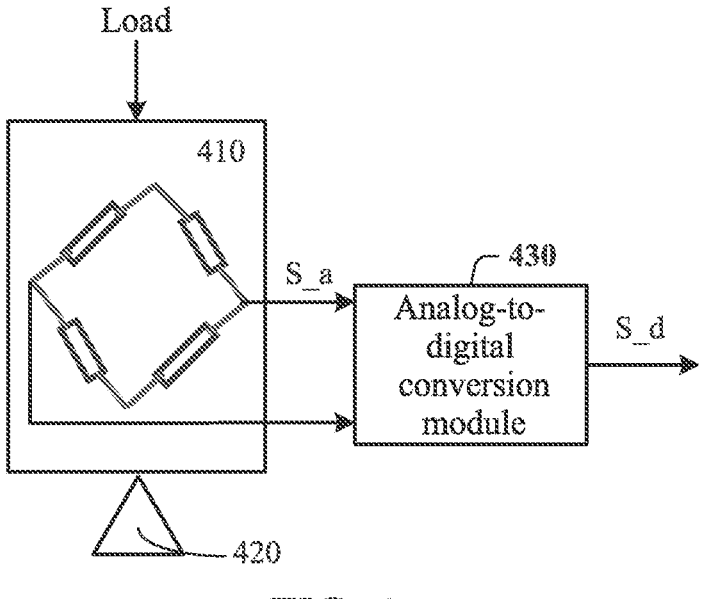
FIG. 4 is a schematic structural diagram of a force measuring element in a digital load cell according to an embodiment of the present invention.

FIG. 4 is a schematic structural diagram of a force measuring element in a digital load cell according to an embodiment of the present invention. Referring to FIG. 4, a structure of a force measuring element 410 is shown, that is, a bridge structure including four resistors is shown. Two outputs of the bridge structure are connected to an analog-to-digital conversion unit 430. When a load is applied onto the force measuring element 410, the force measuring element 410 converts a load force into an analog signal S_a, and the analog-to-digital conversion unit 430 converts the analog signal S_a into a digital signal analog signal S_d for subsequent processing, display, etc.

In some embodiments, the force measuring element 410 may be a resistive strain gauge or a capacitive strain gauge.

In some embodiments, the digital load cell of the present invention further includes one or more limiting protection devices, where the limiting protection device limits the digital load cell to a predetermined area.

Referring to FIG. 4, a limiting protection device 420 may limit the digital load cell to a predetermined area to provide redundancy safety design for overload and impact. In FIG. 4, a triangle represents the limiting protection device 420. For example, when the load falls off the force measuring element 410 onto the digital load cell, the limiting protection device 420 can ensure that the digital load cell does not move downward. FIG. 4 is not used to limit the number, structure, and specific position of the limiting protection device 420.

The digital load cell of the present invention has multiple redundancy design, including, but not limited to, design for weighing elements such as force measuring elements, redundancy design for a detection circuit including an analog-to-digital conversion module, a processor, a storage unit, etc., redundancy design for functional elements including a power supply unit, a communication unit, an alarm unit, etc., and redundancy design for safety facilities including a limiting protection device, thereby providing multiple safety assurance for the digital load cell in a plurality of aspects, and greatly improving the reliability of the digital load cell.

Basic concepts have been described above. Apparently, for those skilled in the art, the foregoing disclosure of the invention is merely an example, and does not constitute a limitation to the present application. Although it is not explicitly stated here, those skilled in the art may make various modifications, improvements, and amendments to the present application. Such modifications, improvements, and amendments are suggested in the present application, and therefore, such modifications, improvements, and amendments still fall within the spirit and scope of exemplary embodiments of the present application.

In addition, specific words are used in the present application to describe the embodiments of the present application. For example, "one embodiment", "an embodiment", and/or "some embodiments" mean a certain feature, structure, or characteristic related to at least one embodiment of the present application. Therefore, it should be emphasized and noted that "an embodiment" or "one embodiment" or "an alternative embodiment" mentioned twice or more in different positions in this specification does not necessarily refer to the same embodiment. In addition, certain features, structures, or characteristics in one or more embodiments of the present application can be appropriately combined.

Similarly, it should be noted that, in order to simplify the expressions disclosed in the present application to facilitate the understanding of one or more embodiments of the present invention, in the foregoing description of the embodiments of the present application, various features may be sometimes incorporated into one embodiment, figure or the description thereof. However, such a method disclosed does not mean that the subject of the present application requires more features than those mentioned in the claims. In fact, the features of the embodiments are fewer than all the features of a single embodiment disclosed above.

In some embodiments, numbers for describing the number of compositions and attributes are used. It should be understood that such numbers used in the description of the embodiments are modified by the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the specification and claims are approximate values, and the approximate values can be changed according to the required characteristics of individual embodiments. In some embodiments, for the numerical parameters, the specified significant digits should be taken into consideration and a general digit reservation method should be used. Although the numerical ranges and parameters used to confirm the breadth of the ranges of the numerical parameters in some embodiments of the present application are approximate values, such numerical values need to be set as precisely as possible within a feasible range in specific embodiments.

What is claimed is:

1. A digital load cell with redundancy design comprising:
   a force measuring element configured to measure a load force applied to the digital load cell and convert the load force into one analog signal; and
   two or more analog-to-digital conversion modules, wherein the force measuring element is connected to each of the two or more analog-to-digital conversion modules, and wherein each of the two or more analog-to-digital conversion modules is configured to receive the analog signal from the force measuring element and independently convert the analog signal into a respective digital signal.

2. The digital load cell of claim 1, further comprising: one or more processors, wherein each of the two or more analog-to-digital conversion modules is connected to at least one of the one or more processors, wherein each of the one or more processors is configured to process the respective digital signal received from a respective one of the two or more analog-to-digital conversion modules.

3. The digital load cell of claim 2, further comprising: one or more storage units, wherein each of the one or more processors is connected to at least one of the one or more storage units.

4. The digital load cell of claim 2, further comprising: one or more power supply units, wherein each of the one or more processors is connected to at least one of the one or more power supply units.

5. The digital load cell of claim 2, further comprising: one or more communication units, wherein each of the one or more processors is connected to at least one of the one or more communication units, which is adapted to communicate with an external device.

6. The digital load cell of claim 2, further comprising: an alarm unit, wherein the at least one of the one or more processors is configured to compare the digital signal with a threshold to obtain a comparison result, and prompt, based on the comparison result, the alarm unit to issue an alarm.

7. The digital load cell of claim 2, wherein the at least one of the one or more processors is configured to calculate a difference between at least two digital signals, and use the difference for fault trend analysis.

8. The digital load cell of claim 2, wherein the processor is configured to, following application of the load to the digital load cell, compare at least two digital signals to obtain a dynamic comparison result.

9. The digital load cell of claim 8, further comprising: an alarm unit, wherein the at least one of the one or more processors is configured to compare the dynamic comparison result with a dynamic threshold range to obtain a dynamic comparison result, and prompt, based on the dynamic comparison result, the alarm unit to issue an alarm.

* * * * *